United States Patent
Short (10) Patent No.: US 8,006,415 B2
(45) Date of Patent: Aug. 30, 2011

(54) CONNECTOR FOR EARTH MOVING IMPLEMENTS

(75) Inventor: Bruce Archibald Short, Auckland (NZ)

(73) Assignee: Bas Manufacturing Limited, Dunedin (NZ)

( * ) Notice: Subject to any disclaimer, the term of this patent is extended or adjusted under 35 U.S.C. 154(b) by 0 days.

(21) Appl. No.: 12/697,669

(22) Filed: Feb. 1, 2010

(65) Prior Publication Data

US 2010/0129145 A1    May 27, 2010

Related U.S. Application Data

(63) Continuation of application No. 10/532,654, filed as application No. PCT/NZ03/00233 on Oct. 21, 2003, now abandoned.

(30) Foreign Application Priority Data

Oct. 24, 2002  (NZ) .......................... 522170

(51) Int. Cl.
  *E02F 3/28*  (2006.01)
(52) U.S. Cl. .......................... 37/468; 414/723
(58) Field of Classification Search ............ 37/468, 37/403; 414/723, 724; 172/272–275; 403/321, 403/322.1, 315, 316, 324, 326
  See application file for complete search history.

(56) References Cited

U.S. PATENT DOCUMENTS

| 2,963,183 | A | * | 12/1960 | Przybylski ................... 414/723 |
| 3,237,795 | A |   | 3/1966  | Kromer |
| 3,498,638 | A | * | 3/1970  | Magruder ..................... 172/272 |
| 3,606,052 | A | * | 9/1971  | Schurz ........................... 414/723 |
| 3,807,769 | A | * | 4/1974  | Thompson et al. ........... 172/272 |
| 3,964,622 | A |   | 6/1976  | Blair et al. |
| 3,985,249 | A |   | 10/1976 | Aker et al. |
| 4,187,050 | A |   | 2/1980  | Barbee |
| 4,243,356 | A | * | 1/1981  | Takojima ...................... 414/723 |
| 4,311,428 | A |   | 1/1982  | Arnold |
| 4,345,872 | A |   | 8/1982  | Arnold |
| 4,397,604 | A |   | 8/1983  | McCain |
| 4,398,745 | A | * | 8/1983  | Azzarello et al. ............. 280/508 |
| 4,417,844 | A |   | 11/1983 | De Pingon |
| 4,480,955 | A |   | 11/1984 | Andrews et al. |
| 4,674,945 | A |   | 6/1987  | Hulden |
| 4,810,162 | A | * | 3/1989  | Foster ........................... 414/723 |
| 4,871,292 | A |   | 10/1989 | Milanowski |

(Continued)

FOREIGN PATENT DOCUMENTS

AU       83467/91       3/1992

(Continued)

*Primary Examiner* — Robert E Pezzuto
(74) *Attorney, Agent, or Firm* — Young & Thompson (57) ABSTRACT

A connector for connecting an implement to a digger or other prime mover is mountable on the digger and has a recess for receiving a connecting pin mounted on the implement. The connecting pin is retained in the recess by a retaining pin that is mounted on the connector. The retaining pin has a head that is seated on a face of the recess and a cylindrical tail portion that is received in a passage formed in the connector to secure the retaining pin on the connector with the head projecting into the recess adjacent the connecting pin. There is clearance between the head and the connecting pin and the head is shaped so that the clearance is reduced to a minimum when the retaining pin is rotated in the passage. The connector advantageously comprises spaced apart side walls joined together by across member in the form of a bent plate.

20 Claims, 6 Drawing Sheets

U.S. PATENT DOCUMENTS

| | | | | |
|---|---|---|---|---|
| 4,881,867 | A | 11/1989 | Essex et al. | |
| 4,986,722 | A | 1/1991 | Kaczmarczyk et al. | |
| 5,082,389 | A | 1/1992 | Balemi | |
| 5,107,610 | A * | 4/1992 | Fusco | 37/444 |
| 5,110,254 | A | 5/1992 | Aubrey | |
| 5,141,385 | A * | 8/1992 | Tibbatts et al. | 414/723 |
| 5,179,794 | A * | 1/1993 | Ballinger | 37/468 |
| 5,332,353 | A | 7/1994 | Arnold | |
| 5,350,250 | A | 9/1994 | Nagler | |
| 5,400,531 | A | 3/1995 | Brown | |
| 5,441,117 | A | 8/1995 | Fartmann et al. | |
| 5,456,030 | A | 10/1995 | Barone et al. | |
| 5,966,850 | A | 10/1999 | Horton | |
| 6,058,633 | A | 5/2000 | Barden | |
| 6,132,131 | A | 10/2000 | Nakamura et al. | |
| 6,139,212 | A | 10/2000 | Heiple | |
| 6,336,785 | B1 * | 1/2002 | Kunzman | 414/723 |
| 6,431,785 | B1 | 8/2002 | Melander | |
| 6,533,527 | B1 | 3/2003 | Inoue et al. | |
| 6,629,811 | B1 * | 10/2003 | Husson | 414/723 |
| 6,659,708 | B2 | 12/2003 | Heiple | |
| 6,691,438 | B2 | 2/2004 | Fatemi | |
| 6,964,122 | B2 | 11/2005 | Cunningham et al. | |
| 6,979,167 | B2 | 12/2005 | Geraghty | |
| 7,426,796 | B2 | 9/2008 | Cunningham et al. | |
| 2002/0071754 | A1 * | 6/2002 | Fatemi | 414/723 |

FOREIGN PATENT DOCUMENTS

| | | |
|---|---|---|
| EP | 0 506 604 | 9/1992 |
| GB | 2 205 299 | 12/1988 |
| GB | 2 331 064 | 5/1999 |
| NZ | 250811 | 6/1997 |
| WO | WO 00/70155 | 11/2000 |

* cited by examiner

CONNECTOR FOR EARTH MOVING IMPLEMENTS

BACKGROUND OF THE INVENTION

1. Field of the Invention

This invention relates to connectors for facilitating the mounting and demounting of earthmoving implements on and off an earthmoving prime mover such as a digger or front end loader. For the sake of simplicity, the term 'digger' will be used herein to refer to any such prime mover.

2. Description of the Related Art

In the absence of such a connector, an implement is usually mounted directly on the end of an arm assembly of the digger. Typically the implement is provided with a pair of spaced, mutually parallel mounting plates. The end of the arm assembly is received between the mounting plates. Two spaced, mutually parallel connecting pins pass through the mounting plates and the end of the arm assembly to join the two together. Under the action of a hydraulic ram arrangement mounted on the digger, the arm assembly is arranged to manipulate the implement. During such manipulation, the implement is able to pivot about the connecting pins.

It has been found useful to be able to mount a variety of implements on diggers and a great many connectors of the type envisaged herein have been proposed for the rapid changing of such implements.

3. Prior Art

Typically a connector comprises a body that is mounted on the end of the arm assembly of the digger. The body has a pair of side walls. Adjacent the connection with the arm assembly, the distance between the outer faces of the side walls is equal to the distance between the outer faces of mounting plates of an implement so that the end of the arm assembly can be received between the side walls of the connector in the same way as it is received between the mounting plates of the implement. Two connecting pins pass through the side walls and the end of the arm assembly to join the connector semi-permanently to the arm. In fact, the same connecting pins that, in the absence of the connector, are used to join the implement to the arm assembly are often used to join the connector to the arm assembly. Adjacent the connection with the implement the side walls of the connector are more closely spaced. In fact the width of the connector here is typically equal to the width of the end of the arm assembly so that this part of the connector is able to fit between the mounting plates of the implement. A second pair of connecting pins passes through the mounting plates and the side walls of the connector to join the implement to the connector. Again, the same connecting pins that, in the absence of the connector, are used to join the implement to the arm assembly are often used to join the connector to the implement.

The implement does not pivot relative to the connector once the two are joined together. Rather, the implement is fixed to the connector and the whole assembly (that is, the assembly comprising the connector and the implement) pivots about the first pair of connecting pins under the action of the aforementioned hydraulic ram arrangement.

In order to speed up the changing of implements, each implement is provided with its own pair of connecting pins for mounting the implement on the connector. These connecting pins are left in place semi-permanently on the implement. They are received in slots and/or catch arrangements provided at opposite ends of the connector. For example, the specification of British patent no 2205299 discloses a connector provided with slots at each end thereof. The slots are disposed at right angles to one another. By this means the connector, carried by the arm assembly of the digger, can be manipulated so that the slot at one end engages one of the connecting pins already mounted on the implement. The connector is then pivoted about that pin until the slot at the other end of the connector engages the second pin on the implement. A locking arrangement, typically controlled by a hydraulic ram, is then actuated to lock the second pin in its slot.

In another example, the specification of international patent application no. PCT/NZ00/00073 discloses a connector having only one true slot. As in the first example, the connector is manipulated so that the slot engages one of the connecting pins on the implement. The connector is then pivoted about that pin until the second connecting pin comes up against a land at the other end of the connector. A hook shaped plate mounted on the connector is actuated, again typically by a hydraulic ram, to hold the second pin in place against the land and thereby to lock the connector and the implement together.

It has already been mentioned that, in the zone adjacent the end of the arm assembly, the side walls of a connector are spaced further apart than they are in the zone adjacent the implement. For operational and safety reasons it is desirable, and even essential, that the implement should be mounted as close as possible to the end of the arm assembly. For these reasons each side wall is abruptly cranked inwards at the junction of the two zones. This causes design problems especially in the case of heavier connectors whose side walls are constructed of heavy steel plate. It is not generally feasible to bend such plate to achieve the degree of cranking required and the side walls of most connectors are consequently constructed of two overlapping steel plates welded together. The connectors disclosed in the two aforementioned patent specifications have such side walls.

Also, good design requires that reinforcing rings should be provided around the holes in the side walls that receive the connecting pins. Conventionally, such reinforcing rings are welded in place.

In addition, one of the aforementioned slots at the end of many conventional connectors is formed in the side walls and in a cross member that joins the side walls together. The cross member is typically formed from a length of heavy steel round bar that that is welded at each end to the side walls. The slot is cut by a machining operation after the parts are welded together.

All this has the result that the cost of conventional connectors so constructed is high on account of the cost of the labour required in the manufacturing processes.

As mentioned above, a mechanism operated by a hydraulic ram is often used to lock the connector and the implement together. The hydraulic ram is operated from the digger and considerably speeds up the changing of implements. In the course of use of such connectors it has nevertheless been found necessary to provide an additional safety device to lock the two together in the event that there is a failure of hydraulic pressure. One such arrangement is disclosed in the specification of New Zealand no. 250811. In this construction, the hook shaped members mentioned above that hold one of the connecting pins in the slot of the connector are carried on a sliding plate. One end of the sliding plate projects through an aperture in an end wall of the connector and the safety device takes the form of a safety pin that passes through the sliding plate and bears on the end wall. The safety pin prevents the sliding plate from sliding backwards and releasing the connecting pin from the slot. The safety pin is inserted by hand.

Similar arrangements involving the use of a safety pin have been devised for other known connectors. In all but one of such arrangements known to the applicant, the safety pin functions to lock the hook shaped member in place. The applicant is aware of one construction in which a safety pin functions to hold the connecting pin in the slot at the opposite end of the connector. In this case the connector in question is of the type having a cross member made up from round bar machined to form the slot as described above. When the connecting pin is in the slot the safety pin is inserted in registering holes predrilled in the round bar and the connecting pin. This arrangement has the disadvantage that the connecting pin must be turned so that the hole for the safety pin is lined up with the holes in the round bar and it is furthermore difficult to insert or remove the safety pin if it becomes bent in use.

SUMMARY OF THE INVENTION

According to the invention there is provided apparatus for connecting an implement to a prime mover, the apparatus including a connector that is mountable on the prime mover and has at least one recess for receiving a connecting pin mounted on the implement to enable the connector to engage the implement, characterised in that means is provided for mounting on the connector a retaining element positioned so that a head of the retaining element serves to retain the connecting pin in the recess.

In one form of the invention, the retaining element has a tail portion connected to the head and the connector has a formation in which the tail portion can be inserted and which serves to secure the retaining element on the connector with the head of the retaining element projecting into the recess adjacent the connecting pin.

According to one aspect of the invention, the dimensions of the retaining element and the formation are such that there is a clearance between the head and the connecting pin which clearance is reduced when the retaining element is rotated after the tail portion has been inserted in the formation.

In one form of the invention, the tail portion and the formation have a common axis about which the tail portion is rotated.

According to another aspect of the invention, at least a portion of the head is larger than the formation so that the head is unable to enter the formation.

In one form of the invention, the head has a face that bears on a face of the connector after the tail portion has been inserted in the formation.

Again in one form of the invention, the face of the connector is at least partly located in the recess.

According to yet another aspect of the invention the connector comprises spaced apart side walls joined together by a cross member that is prefabricated and in which the recess is formed before the cross member is joined to the side walls. Advantageously, according to the invention, the cross member is in the form of a plate that is bent to form the before the cross member is joined to the side walls. It is also advantageous to form the formation for receiving the tail portion of the retaining element in the cross member before the cross member is joined to the side walls.

BRIEF DESCRIPTION OF THE DRAWINGS

The invention is further discussed with reference to the accompanying drawings in which.

DETAILED DESCRIPTION OF THE PREFERRED EMBODIMENTS

In the description that follows, terms such as 'upper', 'lower', 'horizontal' and the like refer to the components in the position and orientation as they are seen in the drawings.

Figure 1:
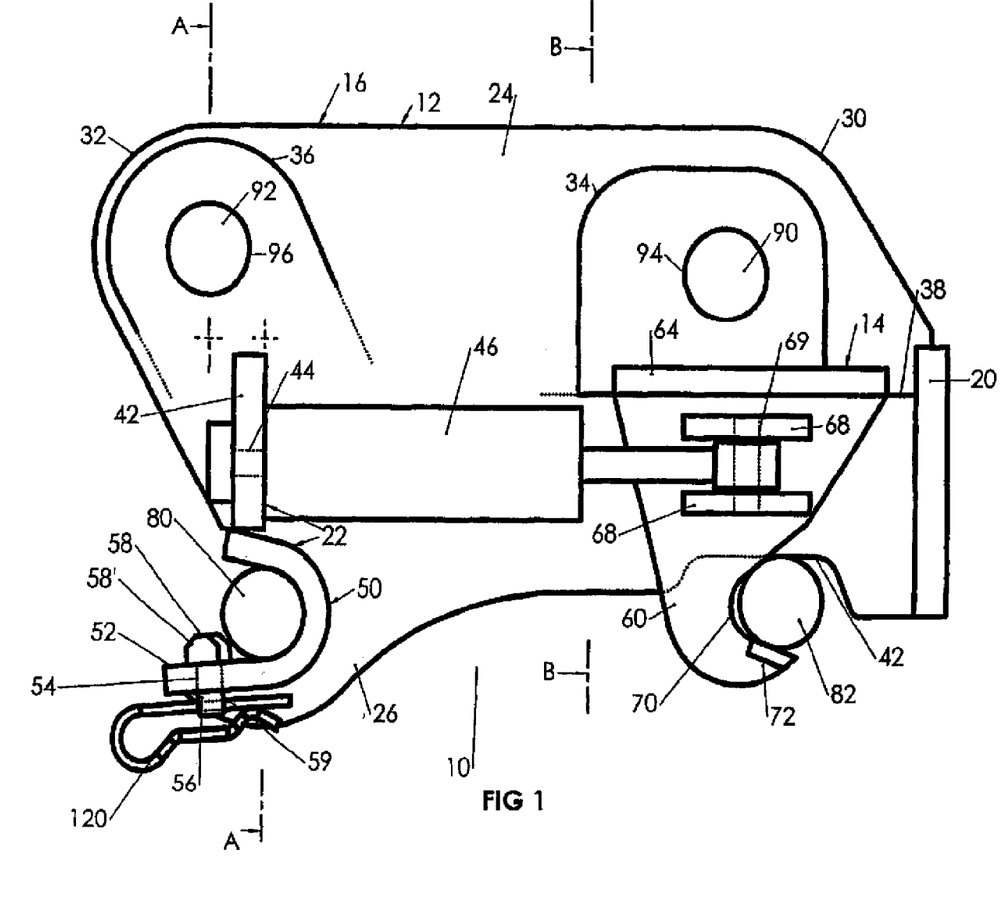
FIG. 1 is a cross sectional side view of a connector assembly.
Figure 2:
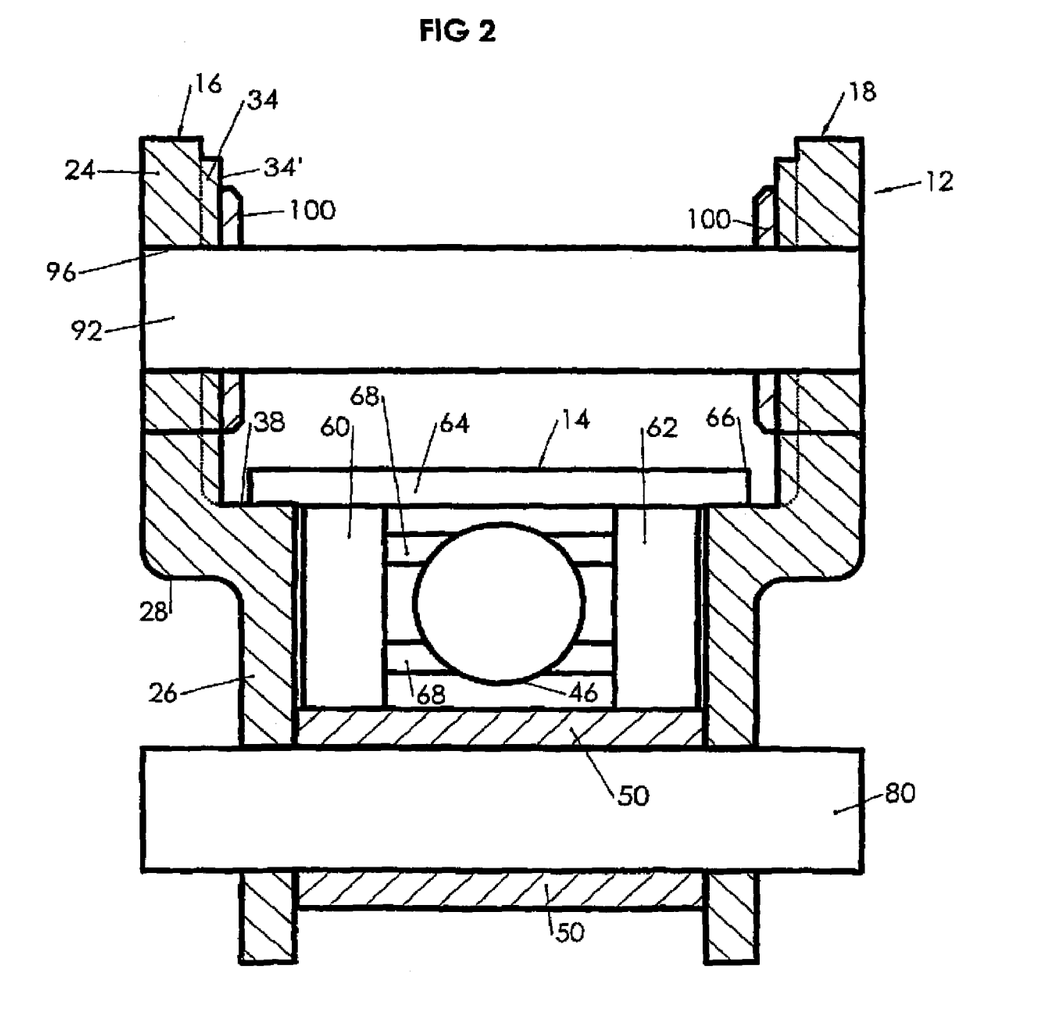
FIGS. 2 and 3 are cross sectional views on Arrows A-A, B-B respectively in FIG. 1.
Figure 3:
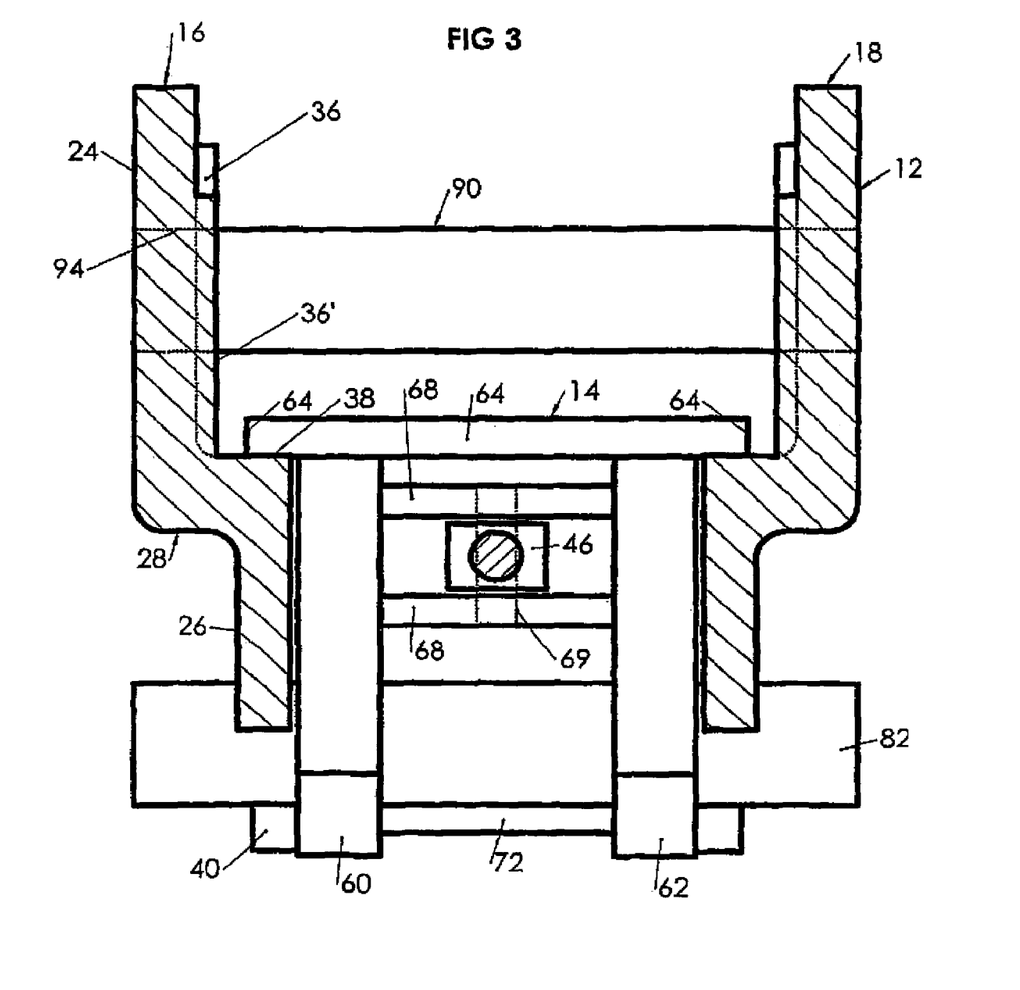

Referring first to FIGS. 1-3, a connector assembly 10 comprises a body 12 in which is slidably mounted a closure member 14. The body 12 comprises side walls 16, 18 that are spaced apart from each other and joined together by cross members 20, 22 located one adjacent each end of the body.

Apart from the fact that they are 'handed', the side walls 16, 18 are substantially similar to one another so only one 16 will be described in detail. The side wall 16 is a steel casting comprising an upper portion 24 joined to a lower portion 26 by a cranked portion 28. The upper portion 24 is parallel to but off set from the lower portion 26. This has the result that, when the body has been assembled, the upper portions of the side walls are further apart than the lower portions. Near the respective ends 30, 32 of the upper portion the casting comprises thickened portions 34, 36. Below the thickened portion 34 the cranked portion 28 comprises a flat portion that is conveniently described as a shoulder 38.

The cross member 20 at the end 30 of the body is fabricated from a flat steel plate welded to the side walls. The cross member 22 at the opposite end 32 comprises two parts. The first part comprises a flat steel plate 42 welded to the side walls below the thickened portions 36. A hole 44 is drilled in this plate and anchors a hydraulic ram assembly 46 that actuates the closure member 14 as will be described. The second part of the cross member 22 comprises a steel plate 50 that is bent into an approximately C-shape and is welded along its edges to the lower portions of the side walls. The plate 50 has a horizontally disposed, flat portion 52. As will be described, the C-shaped plate 50 defines a recess in the form of a slot in which the first of two connecting pins 80, 82 mounted on an implement is received to lock the implement to the connector assembly. A formation the form of a cylindrical passage 54 is drilled in the flat portion 52 for receiving a locking pin 56. The locking pin has a head 58 with a cutaway portion 58' for a purpose that will be described. The head is connected to a tail portion 59 that is received in the passage. The head 58 is larger than the passage 54 and stops the locking pin from passing through the passage. An annular inner face of the head bears on the flat portion 52 of the plate 50.

The closure member 14 comprises two, mutually identical, steel hooking plates 60, 62 welded to a steel sliding plate 64. The sliding plate is substantially rectangular and the respective hooking plates are disposed parallel to but set in from the opposite ends 66 of the sliding plate. In use the ends 66 rest slidably on the shoulders 38 of the side walls. Two steel cross members 68 are welded to the hooking plates below the sliding plate. A pin 69 projects through aligned holes in the cross members and anchors the end of the ram assembly 46 therebetween. Each hooking plate has a hook formation 70 that, as will be described, engages the second 82 of the two connecting pins 80, 82. Wear plates 72 may be optionally welded to the outer faces of the hooking plates adjacent the edges that bear on the connecting pin 82.

Two connecting pins 90, 92 pass through holes 94, 96 bored in the respective thickened portions 34, 36 of the side walls. The connector assembly 10 is connected semi-permanently to the end of the arm assembly of a digger by these connecting pins.

As in the case of conventional assemblies, the dipper arm assembly manoeuvres the assembly 10 so that the connecting pin 80 on the implement enters the slot formed by the plate 50. With the closure member 14 retracted by the ram 46, the assembly 10 is then pivoted about the pin 80 by the digger arm until the pin 82 on the implement lands on the lower edges 42 of the side walls 16, 18. The ram 46 is then advanced until the hook formations 70 on the closure member engage the pin 82. Before the digger lifts the now joined connector and implement, the locking pin 56 is inserted in the passage 54.

The utility of the various features of the connector 10 will now be discussed. The use of a casting to produce each side wall has significant advantages. The labour and difficulties involved in fabricating, assembling and welding the overlapping plates and reinforcing rings to make up a side wall as is done in conventional connectors are largely eliminated. Cast side walls are significantly lighter in weight due to the absence of overlapping plates. The provision of the cast-in thickened portions 34, 36 enables the connector 10 to be easily and economically adapted to fit diggers from different manufacturers. This is achieved in the first place by the ability to machine the faces 34', 36' so that there is a predetermined distance between the two. To further increase the adaptability, rings 100 that have been machined to a predetermined thickness can be tack welded to the machined faces 34', 36'. These rings can easily be replaced, enabling them to serve as wear rings. In addition, when the side walls are cast, the width of the thickened portions (taken along the length of the body) can be selected so that the positions of the holes 94, 96 can be varied within limits while allowing the holes to remain completely within, and reinforced by, the thickened portions.

By known techniques, selected portions of the castings that are susceptible to wear in use can be hardened during the casting process.

By way of illustration, for a connector assembly with a nominal rating of 10-14 tonnes capacity, a weldment of a single size can economically be adapted to have pin centres between 360 and 430 mm, pin sizes between 60 and 70 mm and width between the machined faces 34', 36' between 221 and 261 mm.

Figure 4:
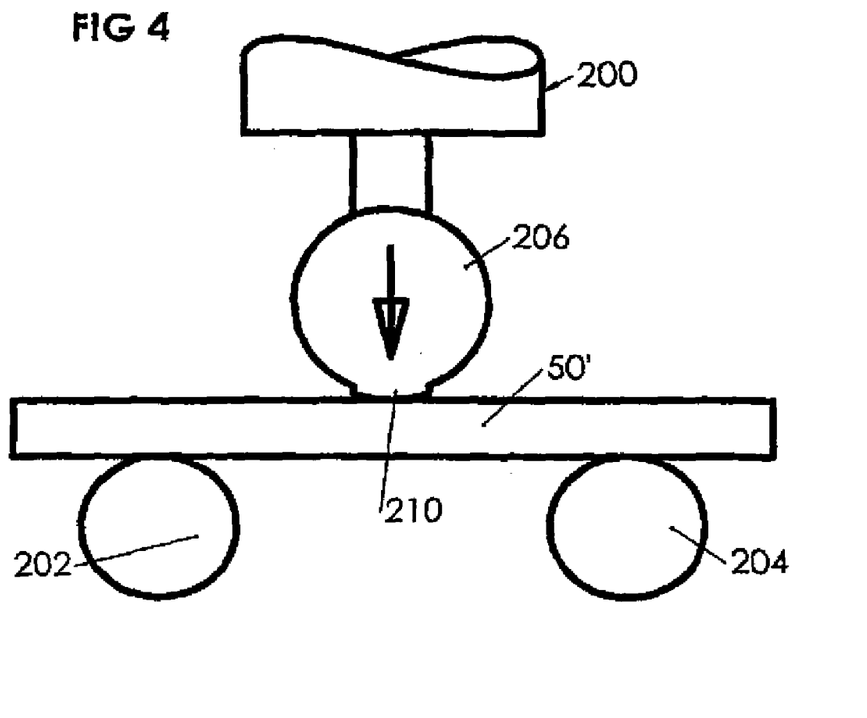
FIG. 4 is a schematic view of a pressing apparatus.
Figure 5:
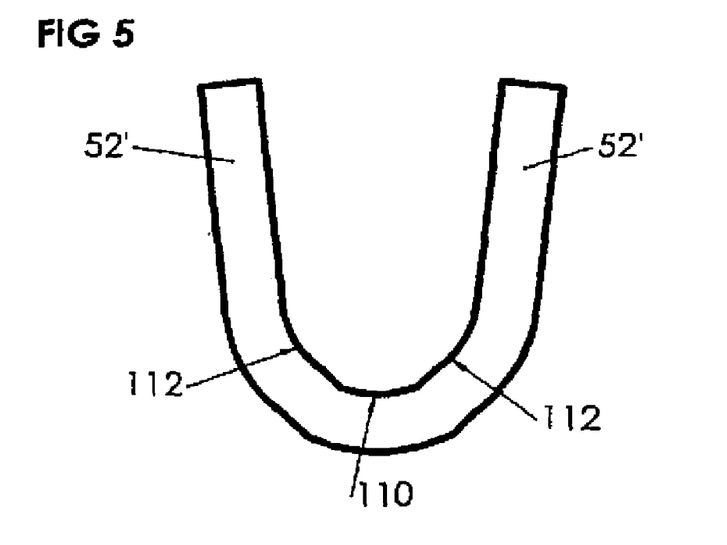
FIG. 5 is a view of a plate after it has been pressed in the apparatus shown in FIG. 4.

The use of a bent plate 50 to form the cross member 22 is also advantageous. In the first place, a bent plate is cheaper and stronger than a machined component of equivalent weight as is used in conventional connectors. A suitable apparatus for bending the plate is illustrated in FIG. 4. The apparatus comprises a pressing ram 200 positioned to act between rollers 202, 204. The ram 200 has an anvil head 206 of preselected radius that bears on a plate 50' still to be bent. The plate is forced between the rollers and in the process part of the plate is bent around the head 206 into a curve of uniform radius as shown in FIG. 5 determined by the radius of the head 206. An unbent portion 52' of the original plate remains on each side of adjacent the bent portion. One of these unbent portions 52' is cut off before the plate is used.

The unbent portion 52 of the plate 50 is useful in the present context for accommodating the passage 54 for the locking pin 56. Furthermore, in the bending process, it is possible to form an indented portion 110 in the bent portion. This is achieved by providing the anvil head 206 with a bulged portion 210. In use, the connecting pin 80 on the implement does not bear on the indented portion 110 of the plate but rather on the portions 112 on either side of the indented portion. The advantage of this is that the pin 80 can undergo considerable wear in use and still remain a tight fit against the plate 50.

When fabricating the plate 50 it is an advantage to use a piece of steel that is wider (in the direction across the connector body) than the plate 50 needs to be in use. After bending the plate can be cut to a predetermined size to enable the connector to which the plate is fitted to be mounted on a selected digger.

The ability to drill the passage 54 and bend the plate 50 to form the recess and the indented portion 110 in the cross member 22 before it welded to the side walls of the connector considerably reduces the manufacturing cost of the connector. Yet another advantage of using the plate 50 to form the cross member is that it can be easily and cheaply cut out and replaced when it has worn out.

The utility of the particular locking pin 56 used here is that the head 58 is seated on the flat portion 52 of the plate 50. This substantially reduces the possibility that the locking bin will be bent in use. It is furthermore advantageous to locate the locking pin as close as possible to the connecting pin 80. The provision of the cut away portion 58' enables the head 58 to clear the connecting pin 80 when the locking pin is being inserted in the passage 54. After insertion, the locking pin can be rotated so that the portion of the head that is not cut away is turned towards the connecting pin 80 and there is minimal clearance therebetween. The locking pin can be retained in place by a spring clip 120.

An advantage of positioning the locking pin at this end of the connector is that it, and the spring clip 120, can more easily be seen by the operator from the cab of the digger. Furthermore, there is only one seat in which the pin can be located. In some earlier connector designs, the locking pin is located at the opposite end of the connector and can be located in either of two seats that are provided for enabling the connector to be mounted on different diggers. There have been reports of serious accidents caused by inserting the locking pin in the wrong seat.

Another advantage of the present connector design is that the pins can be replaced manually and the connector can still be used if the ram 46 or the hydraulic system fails.

Figure 6:
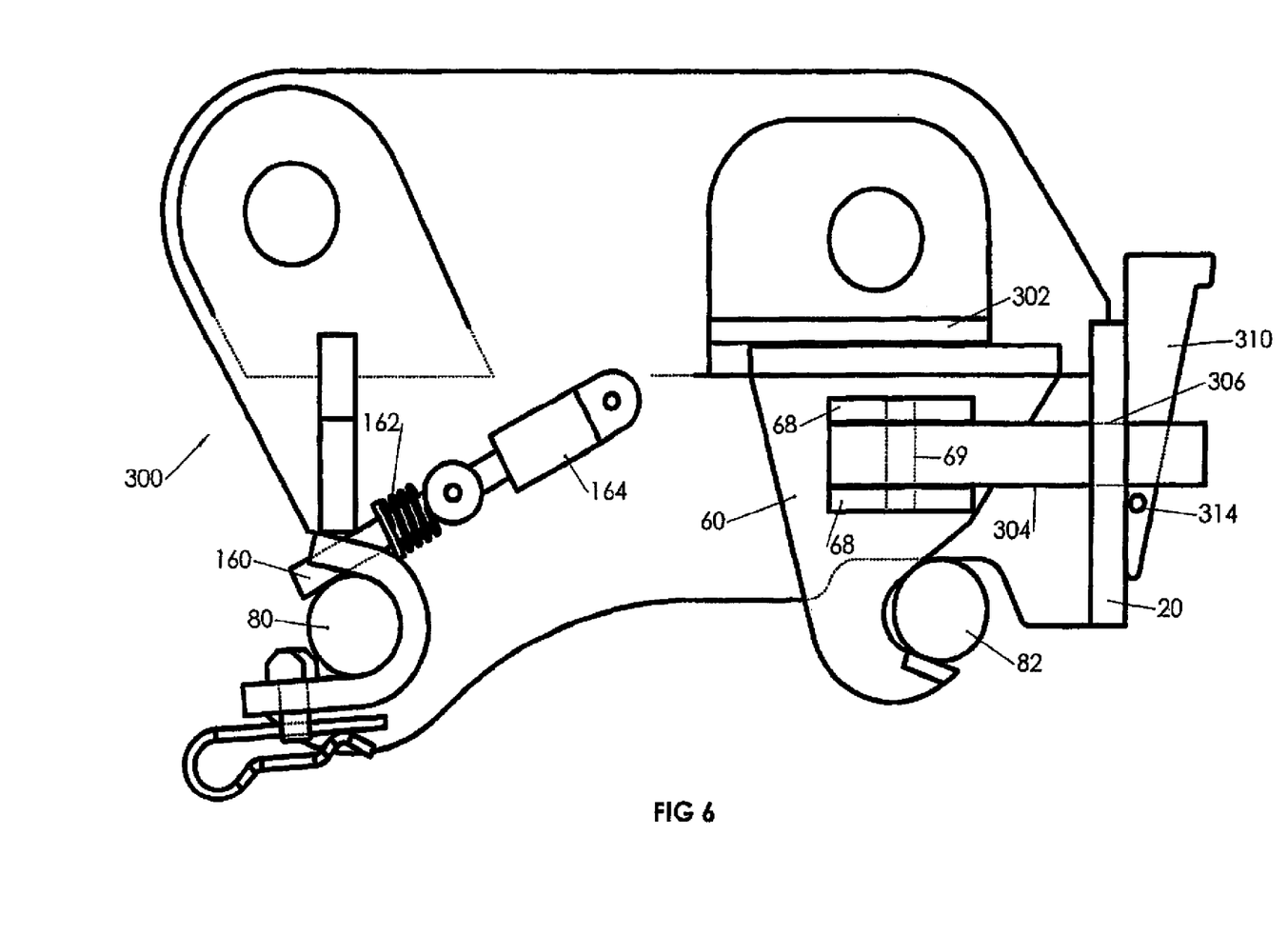
FIG. 6 is a cross sectional view of a modified connector assembly similar to that shown in FIG. 1.

In the connector assembly 300 shown in FIG. 6, the hydraulic ram 46 is omitted. Instead, the closure member 14 is held in place by a steel plate 302 welded to the side walls. A retaining plate 304 projects through a slot 306 in the cross member 20 and is anchored between the cross members 68 of the closure member 14 by the pin 69. A wedge shaped pin 310 is inserted in a complementally shaped hole in the retaining plate. The pin 310 bears in the outer face of the cross member 20 and the wedging action of the pin 310 on the retaining plate causes the closure member 14 to be drawn firmly against the connecting pin 82. A spring clip 314 may be used to prevent the pin 310 from becoming detached from the retaining plate.

In FIG. 6 the connecting pin 80 is locked in place by a locking pin 160 which can be used instead of the locking pin 56. The locking pin 160 is inserted in a passage drilled in the plate 50 in such a position that the locking pin 160 bears on the head of the connecting pin 80. In the present instance, the head is of the same size as the rest of the pin 160. A spring 162 can be provided to hold the locking pin 160 in its seat and a ram 164 can be arranged to withdraw the locking pin from the seat against the action of the spring. Alternatively the ram can be double acting or can be arranged to hold the locking pin in its seat. In the latter case, a spring can be arranged to urge the locking pin out of its seat.

Figure 7:
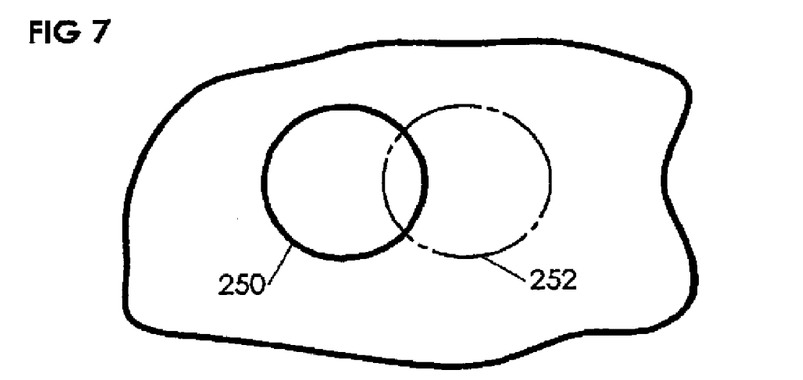
FIG. 7 is a schematic view of a machined part of a side wall of the body of a connector.

As noted, the width of the thickened portions of the castings can be selected so that the positions of the holes for the connecting pins can be varied. This enables a connector of a given size to be fitted to diggers having connecting pins with varying distances between centres. This is discussed with reference to FIGS. 7 to 9. In FIG. 7, the hole for mounting the connector on a given digger (say digger A) is shown in bold outline at 250. For mounting the connector on a digger (say B) from another manufacturer, the hole might be bored in a different position as shown in dotted outline at 252.

Figure 8:
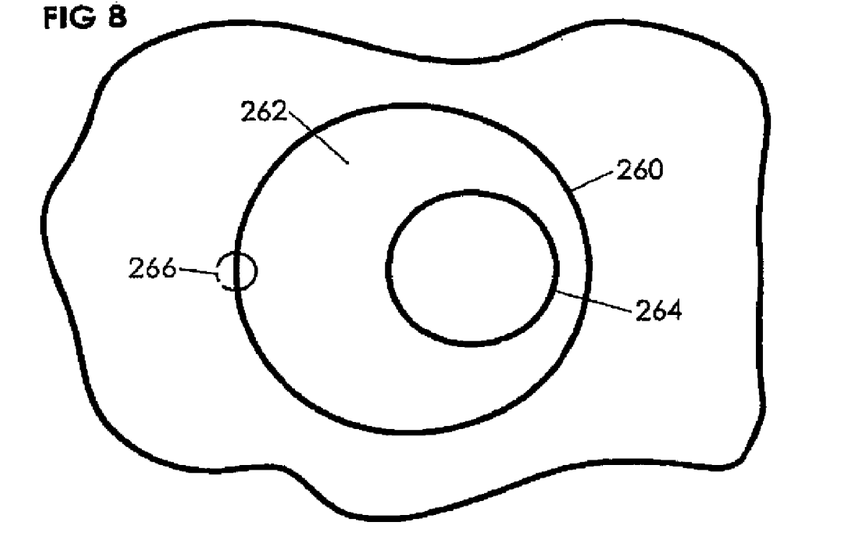
FIGS. 8 and 9 are views, each of an insert for use with the part shown in FIG. 7.

It advantageous to avoid the need for the holes to be bored after the connector leaves the manufacturer's factory. This may be achieved in several ways. An oversize hole 260 may be bored in the side wall of the connector to receive one of several inserts such as that shown at 262. One such insert is provided with a hole 264 positioned so that, when the insert is seated in the hole 260, the hole 264 is in the correct position for mounting the connector on digger A. In another of the inserts the hole 264 is in the correct position for mounting the connector in digger B. Of course it is necessary to ensure that the insert 262 is correctly positioned in the hole 260. There are known techniques, such as the use of a locating dowel 266, for achieving this.

Figure 9:
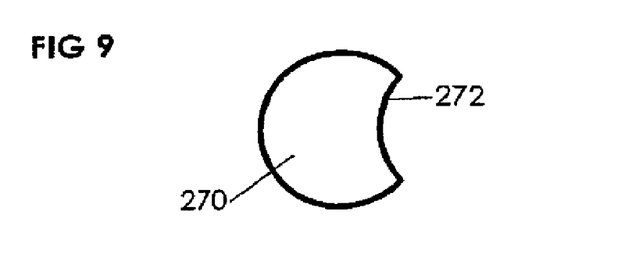

An alternative method can be used where the connecting pins for digger A and digger B are of the same size. After boring the hole 250 in the right position to receive a connecting pin for digger A, an insert 270 is located and tack welded therein. With the insert 270 in place, the hole 252 is bored in the right position to receive a connecting pin for digger B. The hole 252 overlaps the hole 250. In this process, a segment 272 is cut out of the insert. If the connector is to be fitted to digger A the insert is finally welded in place. If the connector is to be fitted to digger B, the insert can be removed from hole 250 and welded in hole 252 with the segment 272 aligned with the hole 250.

The invention claimed is:

1. An apparatus for connecting an implement to a prime mover, the apparatus comprising:
    a connector that is mountable on the prime mover, and has at least one recess for receiving a connecting pin mounted on the implement;
    retaining means provided to, in use, hold the implement on the connector; and
    a locking member that is configured to move between an extended position in which the locking member prevents the connecting pin from exiting the recess and a retracted position in which the locking member allows the connecting pin to exit the recess, the locking member being biased toward the extended position by a biasing means, the locking member being positioned and aligned such that, when in use, as the connecting pin of the implement enters the at least one recess the locking member is pushed by the connecting pin toward the retracted position,
    and when the connecting pin is fully home within the recess the locking member is moved to, and held in, the extended position by the biasing means, and the connecting pin is not able to push the locking member toward the retracted position,
    and the apparatus further includes a powered actuator adapted to selectively move the locking member to the retracted position.

2. The apparatus according to claim 1, wherein the locking member is configured to slide between the extended position and the retracted position.

3. The apparatus according to claim 2, wherein the locking member is configured to slide along an axis that is at an acute angle to the direction of movement of the connecting pin when the connecting pin is exiting the recess.

4. The apparatus according to claim 1, wherein the connector has a first and a second recess, each recess being configured to receive a connecting pin mounted on the implement, the retainer being adapted to secure a first connecting pin of the implement within the first recess of the connector, and the locking member being adapted to secure a second connecting pin of the implement within the second recess of the connector.

5. The apparatus according to claim 1, wherein the connector has a first and a second recess, each recess being configured to receive a connecting pin mounted on the implement, the retaining means being adapted to secure a first connecting pin of the implement within the first recess of the connector, and the locking member being adapted to secure a second connecting pin of the implement within the second recess of the connector.

6. The connector according to claim 1, wherein the locking member is a locking pin.

7. The connector according to claim 1, wherein the biasing means includes a spring.

8. The connector according to claim 1, wherein the actuator is a hydraulic ram.

9. A connector for connecting an implement to a prime mover, the connector being mountable on the prime mover, the connector having at least one recess for receiving a connecting pin mounted on the implement, and retaining means provided to, in use, hold the implement on the connector, and wherein the connector further includes at least one latching means,
    the latching means having a locking member which is supported by, and is movably mounted on, the connector and which is movable between an extended position in which the locking member can prevent the connecting pin from exiting the recess, and a retracted position in which the locking member allows the connecting pin to exit the recess, the latching means also having a biasing means which is adapted to bias the locking member toward the extended position, and
    the movably mounted locking member is positioned and aligned such that, when in use, the locking member can be pushed toward the retracted position by the connecting pin as the connecting pin enters the at least one recess, the locking member can be moved back to the extended position by the biasing means once the connecting pin is fully home within the at least one recess, and once fully home the connecting pin is held within the at least one recess by the locking member and is not able to push the locking member toward the retracted position, and
    the latching means further includes a powered actuator adapted to selectively move the locking member to the retracted position.

10. The connector according to claim 9, wherein the locking member is configured to slide between the extended position and the retracted position.

11. The connector according to claim 10, wherein the locking member is configured to slide along an axis that is at an acute angle to the direction of movement of the connecting pin when the connecting pin is exiting the recess.

12. The connector according to claim 9, wherein the connector has a first and a second recess, each recess being configured to receive a connecting pin mounted on the implement, the retaining means being adapted to secure a first connecting pin of the implement within the first recess of the connector, and the latching means being adapted to secure a second connecting pin of the implement within the second recess of the connector.

13. The connector according to claim 9, wherein the locking member includes a locking pin.

14. The connector according to claim 9, wherein the biasing means includes a spring.

15. The connector according to claim 9, wherein the actuator is a hydraulic ram.

16. An apparatus for connecting an implement to a prime mover, the apparatus comprising:
    a connector that is mountable on the prime mover, and has at least one recess for receiving a connecting pin mounted on the implement;
    a retainer provided to, in use, hold the implement on the connector;
    a locking member that is configured to move between an extended position in which the locking member prevents the connecting pin from exiting the recess and a retracted position in which the locking member allows the connecting pin to exit the recess, the locking member being biased toward the extended position by a spring, the locking member being positioned and aligned such that, when in use, as the connecting pin of the implement enters the at least one recess the locking member is pushed by the connecting pin toward the retracted position; and
    a powered actuator adapted to selectively move the locking member to the retracted position,
    and when the connecting pin is fully home within the recess the locking member is moved to, and held in, the extended position by the spring, and the connecting pin is not able to push the locking member toward the retracted position.

17. The connector according to claim 16, wherein the locking member is a locking pin.

18. The apparatus according to claim 16, wherein the locking member is configured to slide between the extended position and the retracted position.

19. The apparatus according to claim 18, wherein the locking member is configured to slide along an axis that is at an acute angle to the direction of movement of the connecting pin when the connecting pin is exiting the recess.

20. The connector according to claim 16, wherein the actuator is a hydraulic ram.

* * * * *